F. M. CARROLL.
RECORDER.
APPLICATION FILED APR. 21, 1919.
1,358,284.
Patented Nov. 9, 1920.
12 SHEETS—SHEET 1.
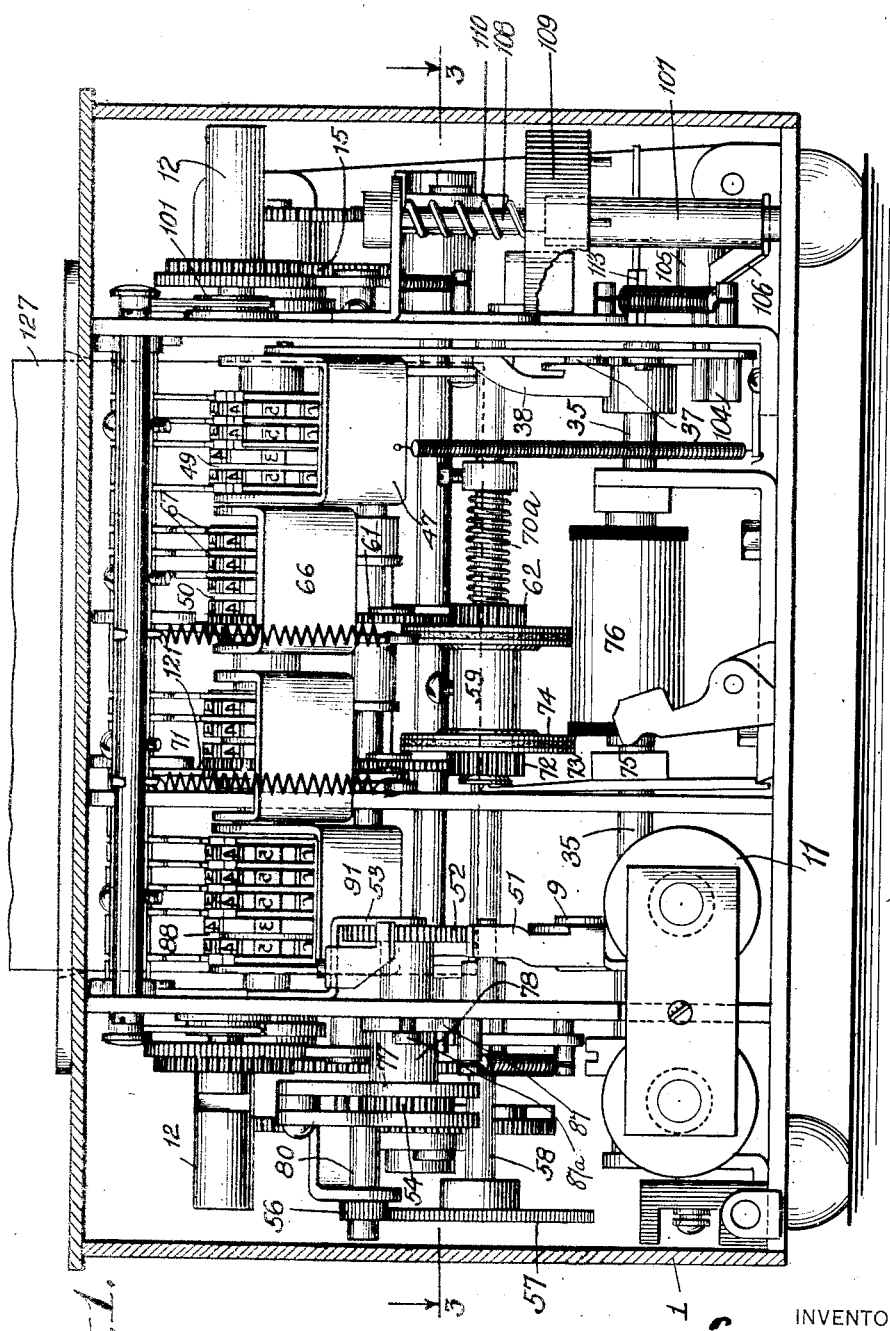
INVENTOR
Fred M. Carroll
BY
Kerr, Page, Cooper & Hayward
ATTORNEY

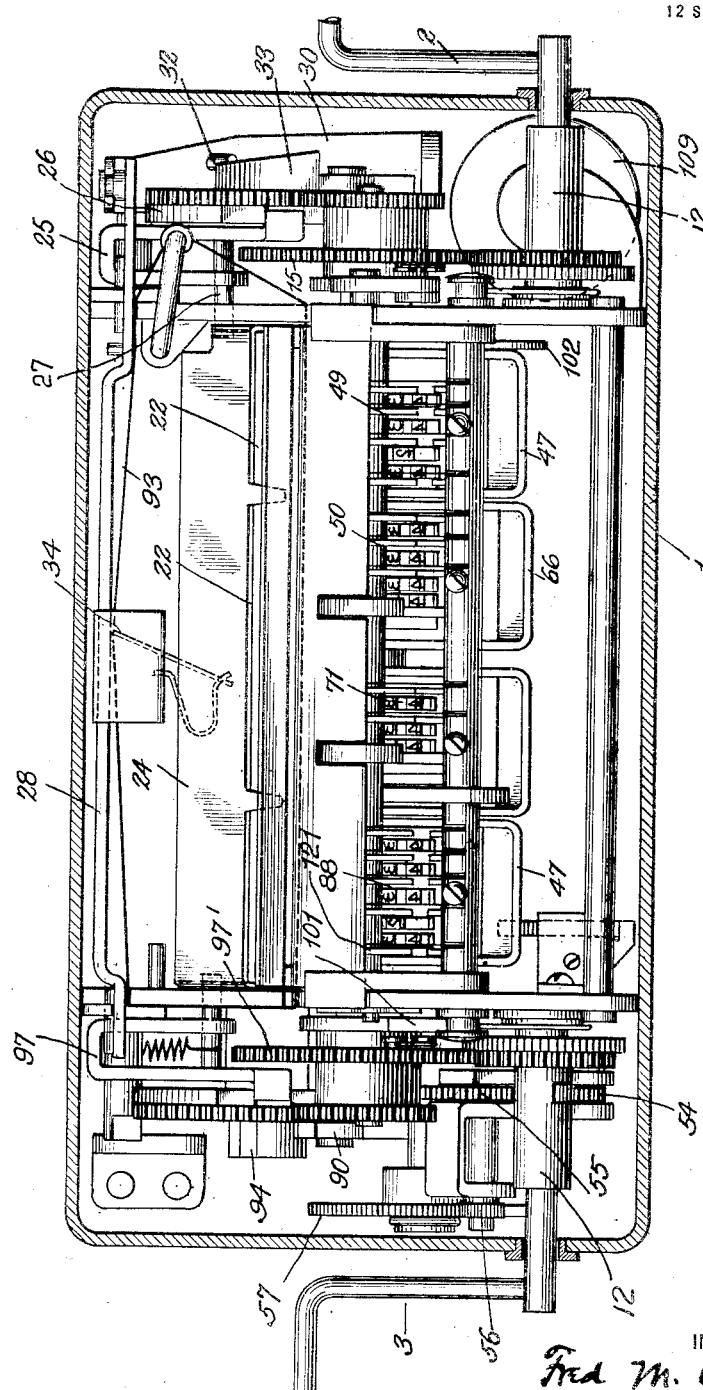

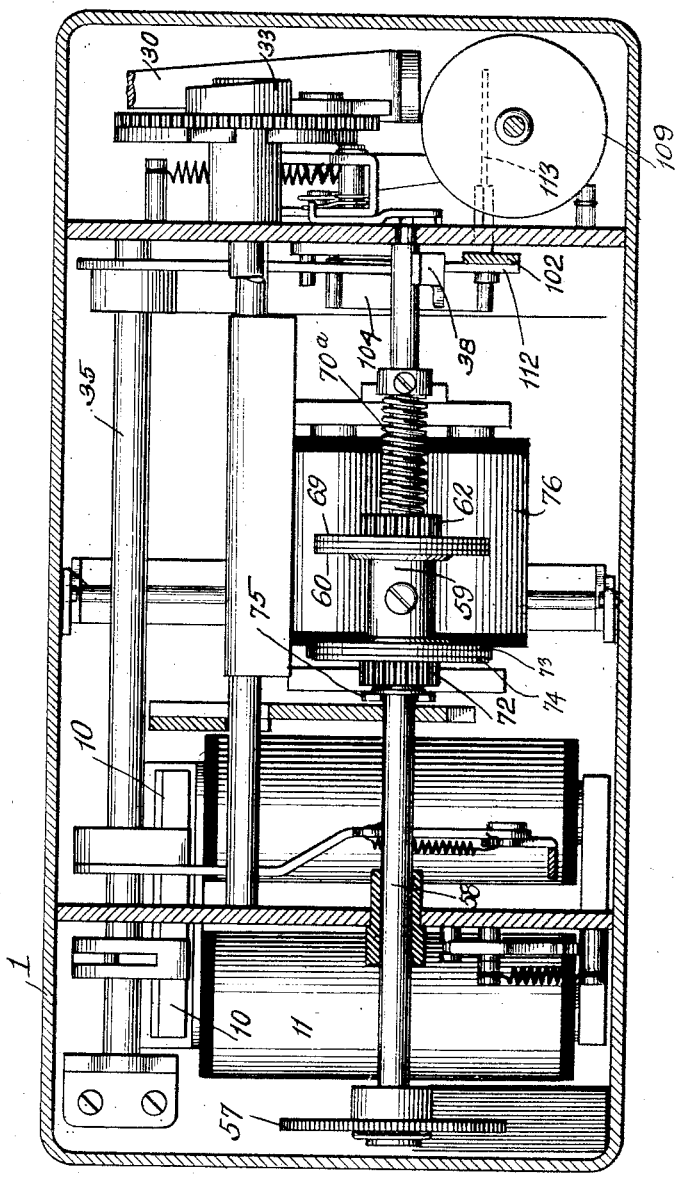

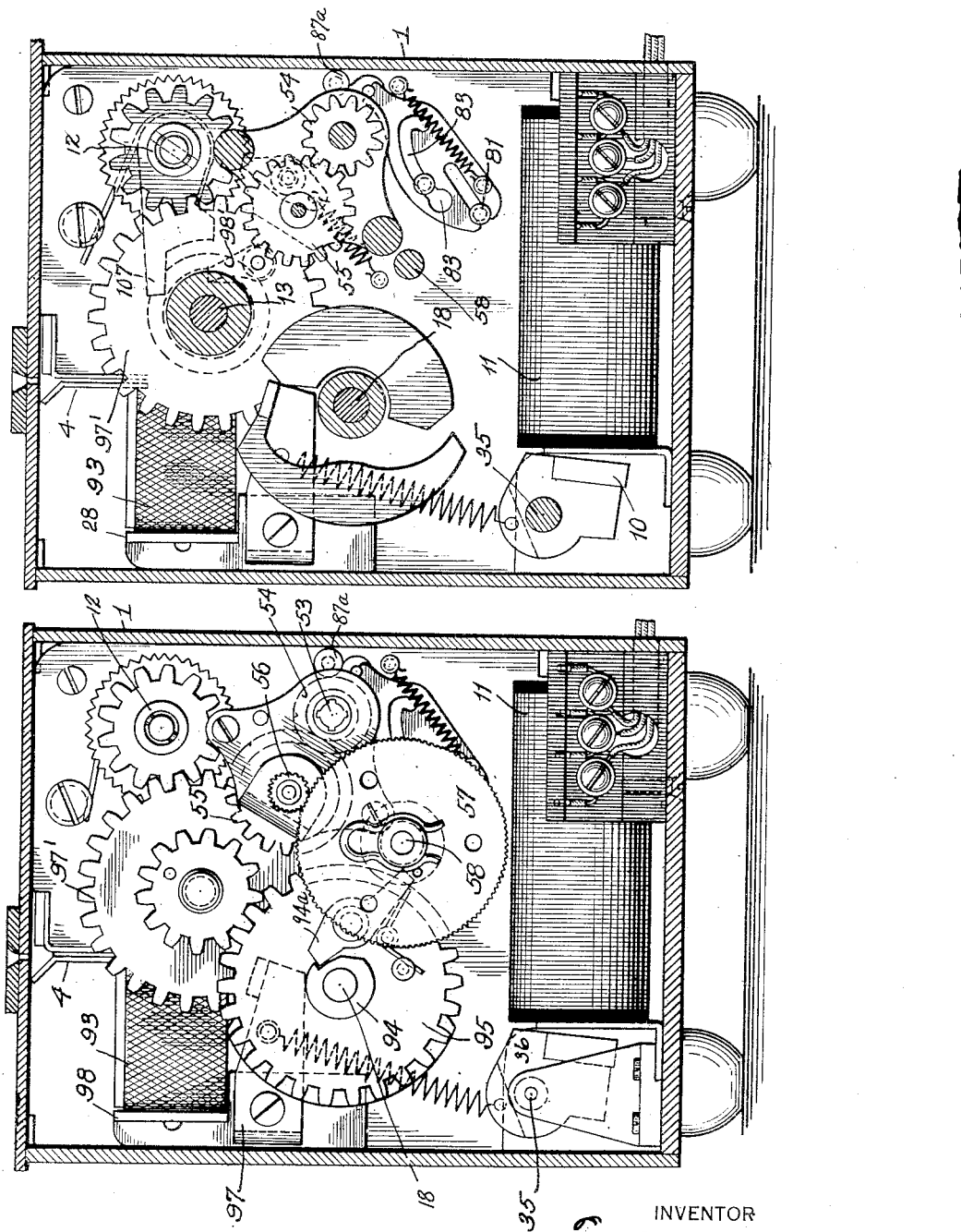

F. M. CARROLL.
RECORDER.
APPLICATION FILED APR. 21, 1919.
1,358,284.
Patented Nov. 9, 1920.
12 SHEETS—SHEET 5.
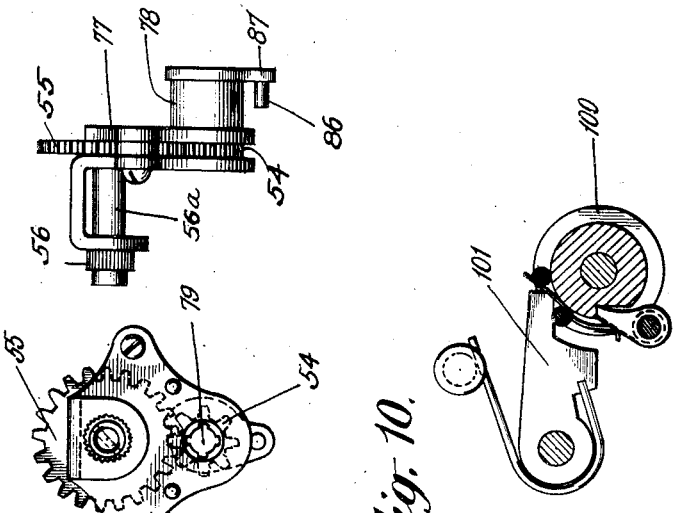
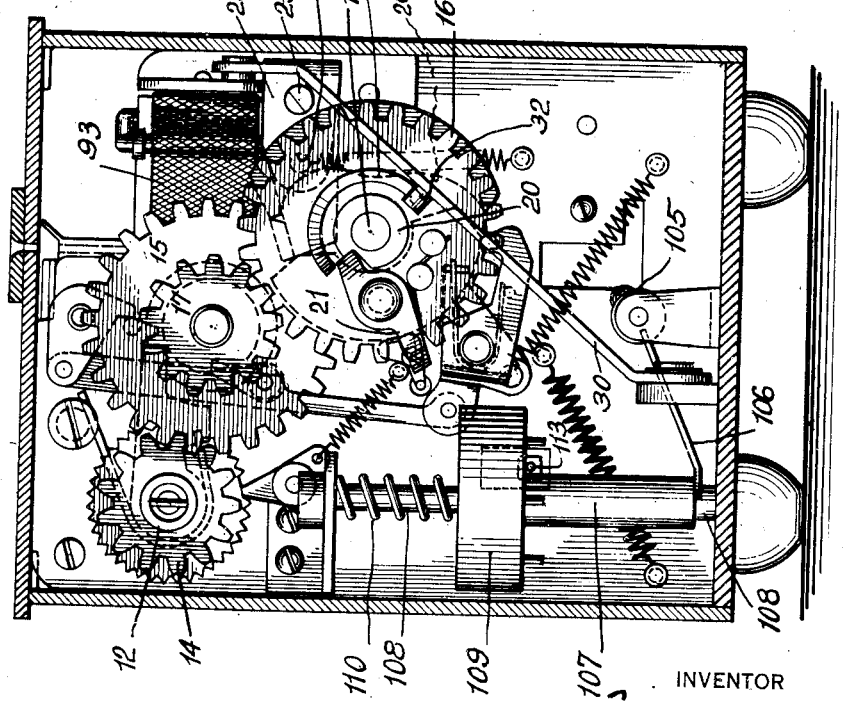
INVENTOR
Fred M. Carroll
BY
Kerr, Page, Cooper & Hayward
ATTORNEY

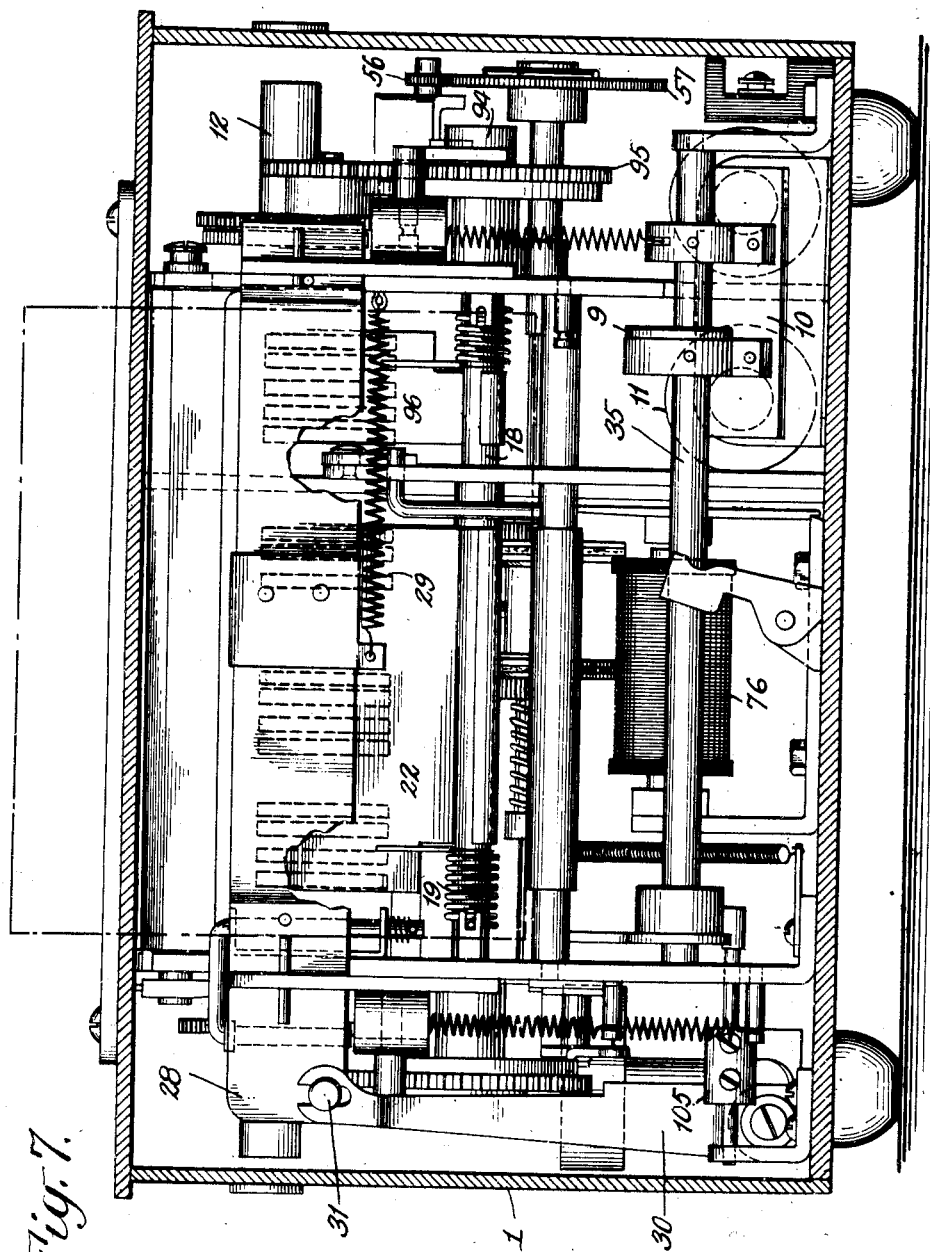

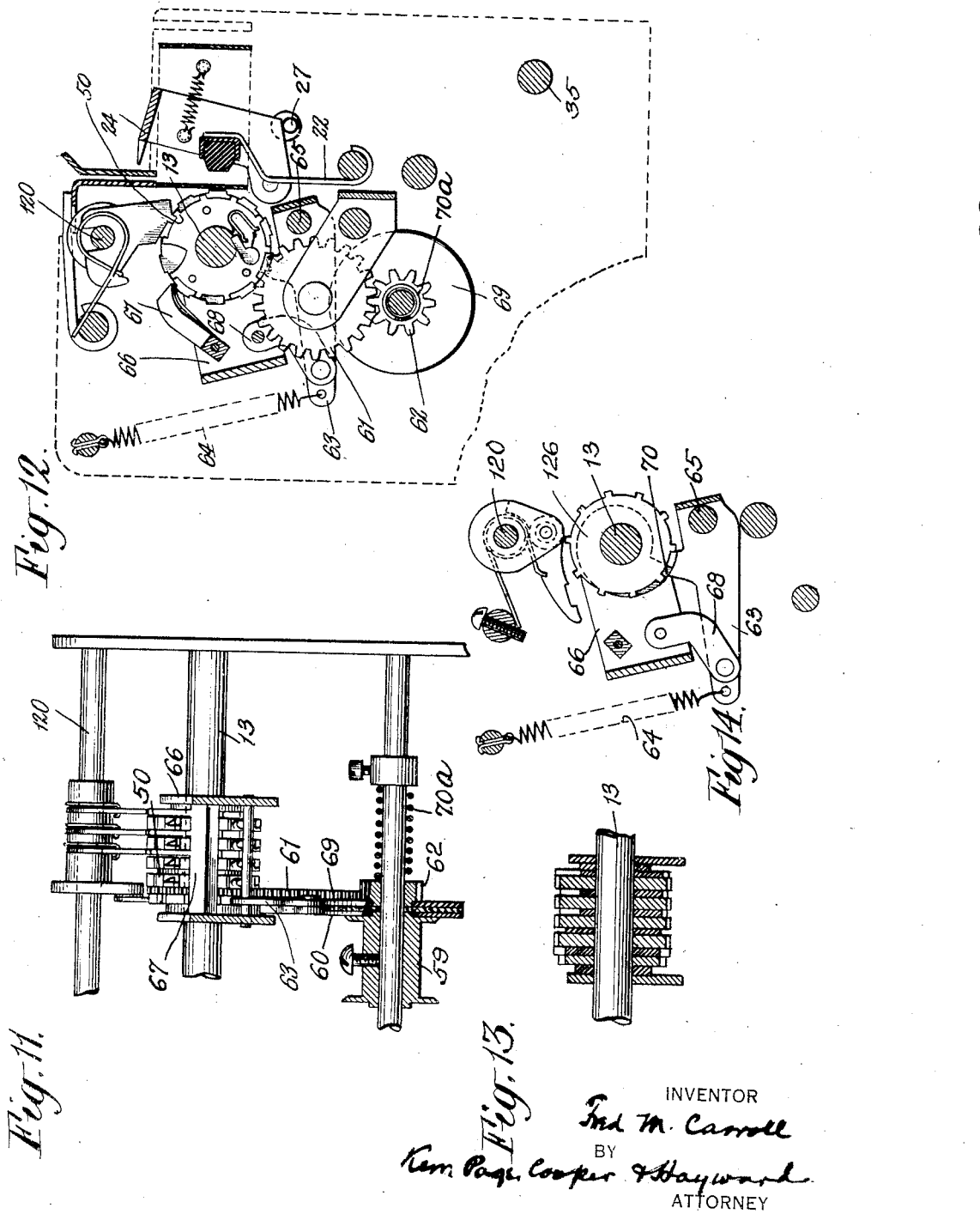

F. M. CARROLL.
RECORDER.
APPLICATION FILED APR. 21, 1919.
1,358,284.
Patented Nov. 9, 1920.
12 SHEETS—SHEET 8.
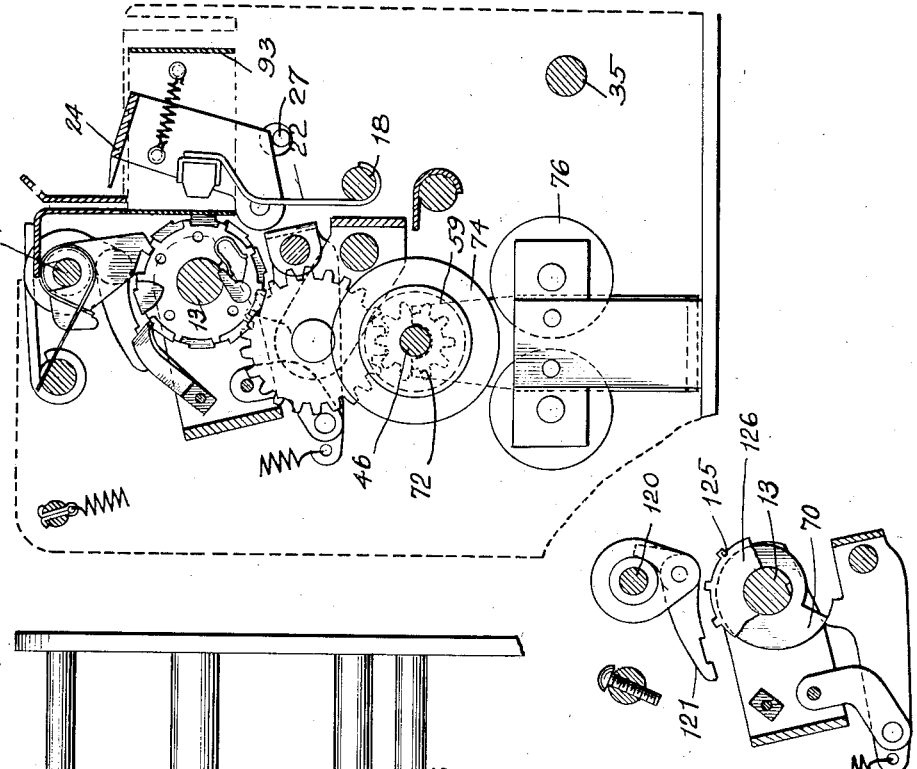
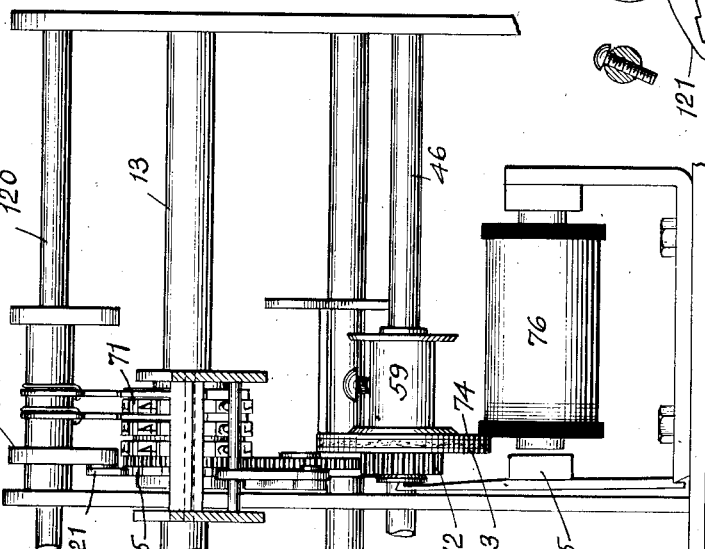
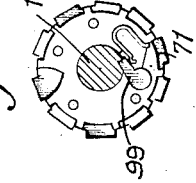
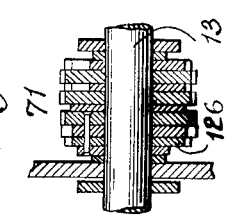
INVENTOR
Fred M. Carroll
BY
ATTORNEY

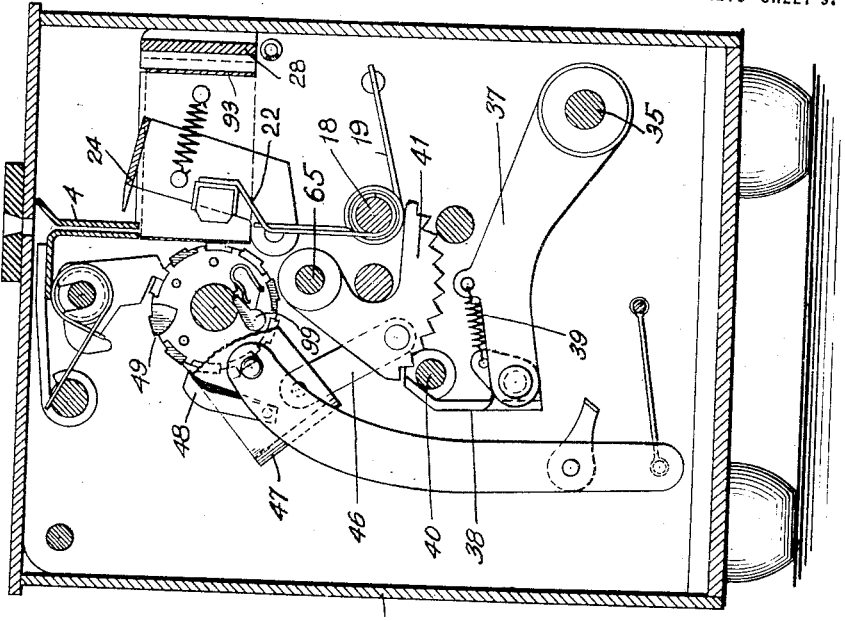
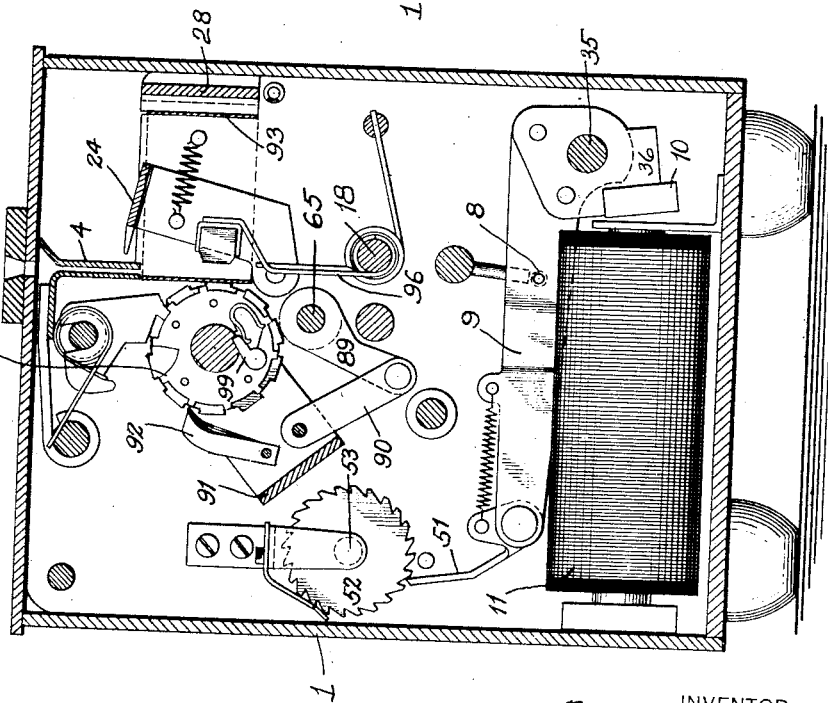

F. M. CARROLL.
RECORDER.
APPLICATION FILED APR. 21, 1919.
1,358,284.
Patented Nov. 9, 1920.
12 SHEETS—SHEET 10.
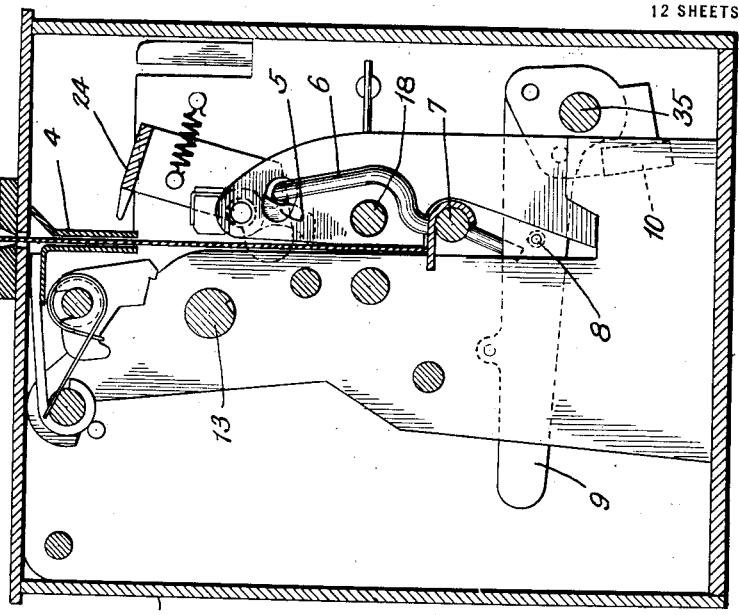
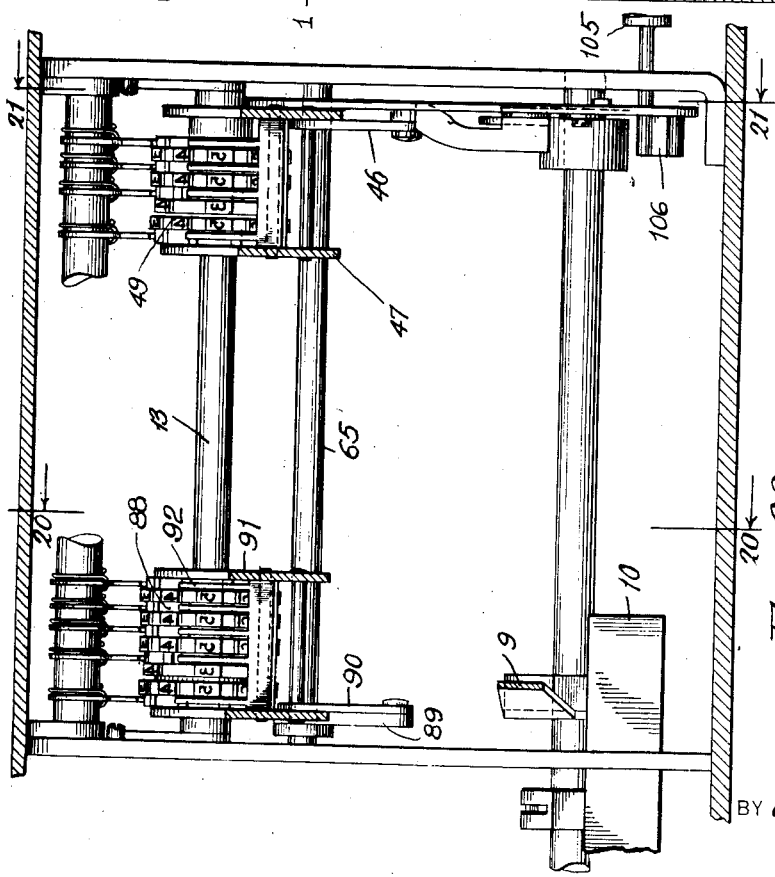
INVENTOR
Fred M. Carroll
BY Kerr, Page,
Cooper & Hayward
ATTORNEY

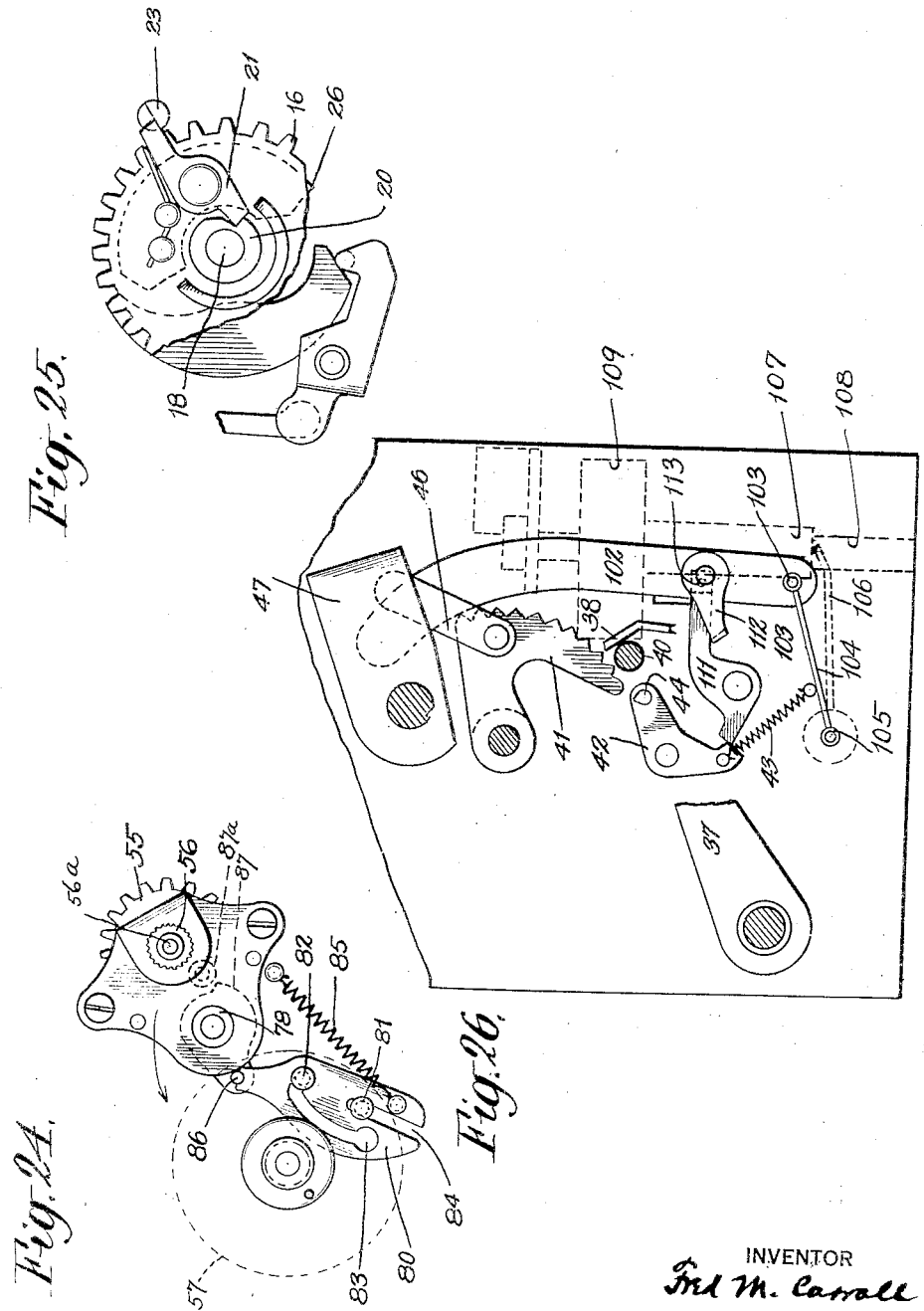

F. M. CARROLL.
RECORDER.
APPLICATION FILED APR. 21, 1919.

1,358,284.

Patented Nov. 9, 1920.
12 SHEETS—SHEET 12.

| Employe No 252 Machine No. 7 | | | |
|---|---|---|---|
| Daily Time | Amount | Overtime Amount | Total Time |
| 745 | 0 6 2 0 | 0 0 0 | 0 2 7 5 9 |
| 128 | 129 | 130 | 131 |
| Shop Order No | | | |
| Operation | | | |
| Rate | | | |

INVENTOR
Fred M. Carroll
BY
Kerr, Page, Cooper & Hayward.
ATTORNEY

UNITED STATES PATENT OFFICE.

FRED M. CARROLL, OF ENDICOTT, NEW YORK, ASSIGNOR TO INTERNATIONAL TIME RECORDING COMPANY OF NEW YORK, A CORPORATION OF NEW YORK.

RECORDER.

1,358,284.  Specification of Letters Patent.  Patented Nov. 9, 1920.

Application filed April 21, 1919. Serial No. 291,659.

*To all whom it may concern:*

Be it known that I, FRED M. CARROLL, a citizen of the United States, residing at Endicott, in the county of Broome and State of New York, have invented certain new and useful Improvements in Recorders, of which the following is a full, clear, and exact description.

The invention for which I now ask for Letters Patent is an improvement in time and wage recording machines, designed for special purposes and use. It is in other words chiefly intended to be a special machine for the individual use of a workman, and by means of which his own time on a certain piece of work, and the value of his time spent on that work, may be recorded and hence readily computed, and which, at the same time, affords a means beyond the workman's control for indicating to the employer the total time spent on the work, which record, being accessible to the employer only, affords a means of checking up the time and cost of any particular job.

Manifestly, the nature of the problem which I have undertaken to solve has required me to devise a small, compact and cheaply constructed device, for, as the number of workmen in a given establishment may be large, and a corresponding number of separate machines would consequently be required, their cost must be low or their use would be prohibitive. The chief distinguishing features of the improvement, therefore, are designed to this end, as functionally they do not differ essentially from many which have heretofore been employed.

In my improved machine I employ an electro-magnet which, energized by periodic impulses from a master or suitably controlled clock, operates two independent sets of time type-wheels, and two sets of time-value wheels, one of the latter for regular and the other for overtime, and I provide a key by means of which a card inserted in the machine may be printed by the workman to show the time he has spent on a job and the value of his time or of his overtime. I also provide a special or employer's key by the use of which the total time spent on a job may be printed from one of the two sets of time wheels over which the workman has no control.

There are certain details in such a machine which must be carefully considered and adequately provided for, chief of which is a ready means for indicating the value of the workman's time at different rates, and others of a more general, but not less important, character, such as means for controlling the operation of the overtime indicator and means for resetting the type-wheels to zero, and means for feeding an inking ribbon or other means of supplying ink to the type-wheels, and the like. All of these I shall herein describe in new and improved form, and have illustrated them in the accompanying drawings:

Figure 1 is a front view in elevation of the mechanism with the front of the containing case removed.

Fig. 2 is a top plan view of the same.

Fig. 3 is a horizontal section on the line 3—3 of Fig. 1.

Fig. 4 is an end view of the mechanism looking from the left.

Fig. 5 is a similar end view with certain gears and parts removed to exhibit the parts beyond.

Fig. 6 is an end view looking from the right.

Fig. 7 is a rear view in elevation corresponding to Fig. 1.

Fig. 8 is a detail in elevation and Fig. 9 the same in side view of the means for varying the computation of time values.

Fig. 10 is a detail of a locking pawl which picks up the type-wheels to carry them to zero.

Fig. 11 is a part sectional detail of the value computing type-wheels and the mechanism for setting them.

Fig. 12 is a detail sectional view of the setting mechanism.

Fig. 13 is a central sectional view of the type-wheels and cams of the same group.

Fig. 14 is a detail of the parts shown in Fig. 12.

Fig. 15 is a view of the overtime type-wheels and means for setting the same.

Fig. 16 is a detail of the setting mechanism for the same.

Fig. 17 is a view of one of the type-wheels.

Fig. 18 is a sectional view of the overtime type-wheels.

Fig. 19 is a detail of parts of the setting mechanism for the same.

Fig. 20 is a sectional view looking to the left on line 20—20 of Fig. 22.

Fig. 21 is a sectional view looking to the left on line 21—21 of Fig. 22.

Fig. 22 is a front elevation of the daily time and total time groups of type-wheels.

Fig. 23 is a sectional elevation of the printing mechanism and a lock-out for the magnet.

Fig. 24 is a detail of the variable cost computing mechanism.

Fig. 25 is a detail pawl mechanism.

Fig. 26 is a detail in elevation looking to the left of the daily time type-wheel operating device.

Figures 27, 28:
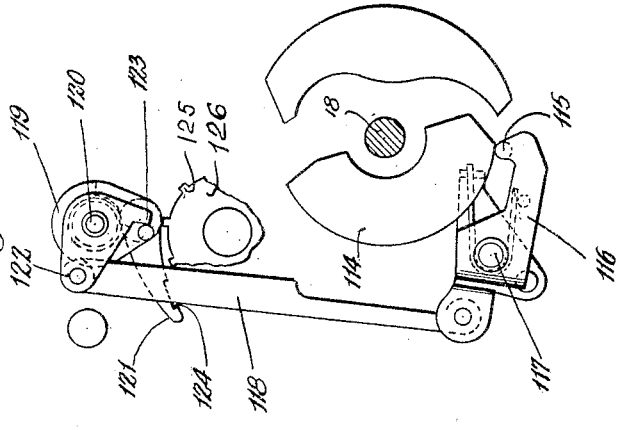

Fig. 27 is a detail of a certain cam and recording wheel adjusting mechanism; and, Fig. 28 is a view of one of the cards used with the machine. This card is one first used by the workmen and having imprints thereon of daily time, amount and overtime amount. The card also shows a total time imprint which is made upon the same card by the employer.

The apparatus is inclosed in a suitable box or casing 1 which may be placed in a convenient location for ready access by the workman to whom it is assigned and by the employer's representative. A key 2 usually in the form of a crank handle is furnished the workman and is adapted, when inserted by him in its appropriate key-hole, to operate his portion of the device. Another key 3 is retained by the employer and this is intended to be inserted in another keyhole and to operate the mechanism that prints from the total time type-wheels whenever this may be desired, and to reset such type-wheels to zero position.

As the parts or elements which make up the apparatus are comparatively free from complication and their specific character will be readily understood by one skilled in this art from a mere statement of their functions, the nature of the invention, as a whole, will be most readily comprehended from a somewhat detailed statement mainly devoted to the manner of use and mode of operation.

Normally the device is maintained in an inoperative condition and makes no record of time or cost, and this is effected by the means best illustrated in Fig. 23. The casing is provided with a vertical card chute 4 and when a workman begins a piece of work he must first insert a card into this chute. The card encounters and forces aside a pivoted lever 5, and thereby engages and forces aside the upper and longer arm of a lever 6 pivoted at 7, and throws its shorter end out of the path of a stop or pin 8 on the lever 9, which carries the armature 10 of an impulse electro-magnet 11, which affords the power for setting the various type-wheels. This operation frees the lever 9 so that it may be moved by the attraction of the magnet 11 for its armature and thus impart movement to the recording type-wheels as will be hereinafter described.

The workman having inserted a card then inserts his key into a key-hole which is provided in the hollow spindle 12 and, assuming the type-wheels to be all set to zero position, he may then turn at any time thereafter his key to print upon the card the time indicated by the right-hand group of four groups or sets of type-disks or wheels all mounted on a transverse shaft 13. The workman's key 2 is not interchangeable with the employer's key 3 and cannot be used by the workmen to set back the employer's devices.

The spindle 12 carries a gear-wheel 14 which meshes with a gear 15, which in turn imparts rotary movement to a gear-wheel 16 by the engagement therewith of a pinion 17 fixed to gear 15. The gear 16 is carried by a sleeve 20 mounted loosely on a shaft 18 to which one end of a coiled spring 19 is connected, the other end of the spring being secured to the stationary frame. The outer end of the sleeve 20 is formed as a cam (see Fig. 25) or with a notch therein which, when the gears are turned to print, is engaged by a spring-actuated pawl 21 pivoted to gear 16 by means of which the sleeve is locked to said gear and rotated thereby, and the spring connected to said sleeve is wound up.

The sleeve carries a printing platen 22 rigidly attached thereto and this platen will be moved away from the type-wheels by the rotation of sleeve 20 until the tail of pawl 21 strikes a fixed stop 23 which disengages it from the end of sleeve 20 and releases the sleeve which, under the action of spring 19, throws the printing platen against an inking ribbon 93 and prints the characters which are in printing position on the card.

The same movement of the gear 16 which effects the printing also locks the card in its chute by the following means. Above the pivoted printing platen is a pivoted spring retracted frame 24 having pins thereon which are adapted to enter holes in the side wall of the card chute and to enter perforations in the card therein. A lever 25 (see Figs. 2 and 6) pivoted about 23 as a center and spring retracted rides on the edge of a cam plate 26 shown in dotted lines in Fig. 25, which is fast to the inner side of the gear 16 and this lever carries a pin 27 (Fig. 2) that projects through a slot in the frame under the edge of one side of the frame 24 (Figs. 12 and 16). During the printing movement and until the key is fully turned back to reset the type-wheels, this frame 24 is therefore held by the pin 27 in a position in which its pins pass through holes in the card and lock the card in its chute. The card cannot be released until the key has turned back to its original position for resetting the type-wheels in zero position, because the lever 25 remains in its elevated position at all times except when the cam 26 has been turned to permit it to drop.

The movement of the gears that effects the printing also feeds the inking ribbon by the following means: A sliding plate 28 (Figs. 2 and 7) retracted by a spring 29 is mounted in suitable guides and a lever 30 pivoted to the base of the instrument engages with a pin 31 at its end. By the action of the spring 29 a pin 32 on this lever is held in engagement with the edge of a cam 33 on the gear-wheel 16 so that as the latter is turned to print the lever 30 and the plate 28 are drawn in one direction and permitted to return on the movement of the gear in the reverse direction. A suitable engaging point 34 carried by the plate 28 picks up the ribbon when the plate is moved to the right and feeds it, but releases it when moving in the opposite direction.

We have assumed that the workman has started the time-recording mechanism by the insertion of his card and we may now explain the operation of such mechanism. The machine is equipped with an impulse magnet 11, which receives a momentary flow of current at given intervals. This magnet, when energized, attracts its armature 10 and thereby imparts rocking movement to the shaft 35 to which it is rigidly connected by a plate 36, and through such shaft to two levers 9 and 37 (Figs. 20 and 21). The lever 37 carries a pawl 38 held by a spring 39 against a shaft 40 and is adapted to engage with the teeth of a segmental ratchet 41 and to raise said ratchet one tooth each time that the magnet is energized.

A pawl 42 (see Fig. 26) in the form of a right-angled lever is pivoted to the side plate of the recorder and by a spring 43 is held normally in a position in which a pin 44 at its other end is held in engagement with the ratchet 41, and acts as a retaining pawl to hold the ratchet when raised by the pawl 40.

The segmental ratchet 41 is connected by a link 46 (Fig. 21) with a plate 47, bent to the shape of a three-sided frame pivoted to type-wheel shaft 13 and carrying a pawl 48 which engages with the first of a group of time type-wheels 49 so that by a movement of predetermined extent of the plate or frame imparted to it by the segmental ratchet 41, the units member of these wheels is moved one space. The wheels are provided with suitable carrying or transfer mechanism which, though shown, need not be described in detail as they do not form a part of this invention, and the means for permitting the segment to drop after being raised will be hereinafter described.

The type-wheels 49 are known as the daily time wheels and by the means described they are set by the action of the magnet 11 to show the time that may have elapsed from the start of a job to its completion or to its interruption at the noon hour or over night, or any other time. Another group of type-wheels 50 is arranged adjacent the first and these are designed to record the money value or cost of the time spent on the job, such operation being effected by the following means.

The lever 9 carries a spring-retracted pawl 51 (Fig. 20) that engages with a ratchet-wheel 52 on a shaft 53 mounted in the side plate of the device, and by this means imparts rotation to gear-wheels 54 and 55 (Fig. 4 and Fig. 5) and by them to a pinion 56 that engages with and rotates the gear-wheel 57. This system of gears is so arranged that the gear-wheel 57 will be turned at a rate proportional to the time indicated by the type-wheels 49, and will set the group of time-value wheels to indicate the money-value of that time at a given rate. For this purpose the gear-wheel 57 is fast to a shaft 58, which latter carries a sleeve 59 having a friction disk 60 thereon, against which is forced a disk 69 carrying a pinion 62 by means of a spiral spring 70$^a$. The pinion 62 engages with a gear-wheel 61 which meshes with a gear fast to the first wheel of the group of value-wheels 50 and rotates the same.

The transfer or carrying mechanism for this group of wheels consists of a three-sided frame 66 pivoted about the type-wheel shaft 13, and carrying pawls 67. This frame is connected by a link 68 with a lever 63, pivoted on shaft 65 and having a projection that rides on a cam 70 (Fig. 14) fast to the first wheel of the group, so that whenever this wheel makes one revolution the frame 66 is depressed and by the action of a spring 64 is raised to shift the wheel of the next higher order of units one space.

Alongside the group of time-value wheels 50 is a group of overtime-value wheels 71. These wheels are operated by a pinion 72 and gear connection of the same character as that used for setting the wheels 50, but this pinion is carried by a friction disk 73 which is adapted to be forced into contact with a disk 74 on the sleeve 59 by the armature 75 of an electro-magnet 76 when said armature is attracted by the magnet. Normally this magnet is inactive and the recorder operates without actuating the group of overtime type-wheels, but when overtime charge is to be computed the circuit of magnet 76 is permanently closed by any suitable means at any desired point, so that a record of overtime or overtime charge is made.

If the rate of pay for time were always fixed, it is manifest that any gears that impart to the time and overtime value wheels a movement proportional to the time will answer the purpose either for recording the exact value or some proportionate amount. Rates of pay may, however, vary and, to meet such conditions, there is provided an intermediate gear which is adjustable to different rates or which may be readily withdrawn and exchanged for another indicating a different rate and replaced without difficulty. This mechanism is shown in Figs. 1, 8, 9 and 24.

A frame 77 having a sleeve 78 extending from one of its side plates is adapted to slide over the end of the ratchet spindle 53 which extends through the side plate of the machine, the spindle end and the bore of the sleeve 78 being formed as shown at 79 in Fig. 8, so that the rotary movement of the spindle, when the parts are associated, will be imparted to the gear-wheel 54 mounted in the frame and thereby transferred to the gear 55, also mounted in the frame and to the shaft 56$^a$, which carries the pinion 56 that engages with the gear-wheel 57. The rate of rotation thus imparted to gear 57 thus obviously depends upon the relative diameters of the gear wheels 54 and 55, and either these may be changed or a number of frames with differently related wheels may be used and substituted one for another, as may be required. The gear-wheel 57 which has fine teeth may be readily taken off and replaced by another with different teeth to properly record fractional values. For example a man's time may be worth 35 cents an hour or 37½ cents an hour and gears for correctly computing these or other values may be used.

To hold the gears in frame 77 always in proper engagement with the gear 57, any proper means such as shown in Fig. 24 may be used. In this figure 80 is a plate held by headed screws or pins 81, 82, and slots 83 and 84, to the outside of the side plate of the machine and actuated by a spring 85 connected to one end of the plate and the frame of the recorder, respectively. The other end of the plate is bifurcated to engage with a pin 86 on an extension 87 from the sleeve 78. In Fig. 24 the frame 77 is shown as swung to its limiting position out of engagement with the gear 57 but when the frame is turned back the plate 80 is turned about the pin 81, the pin 82 travels in the slot 83, and the spring 85 is put under tension, until the pin 86 passes the critical point when the spring throws the frame 77 and acts to hold the pinion 56 firmly in engagement with the gear 57. This arrangement maintains proper meshing of the gears, irrespective of varying diameters of gear 57. The swinging movement of frame 77 is also utilized to prevent the accidental endwise withdrawal of the frame and the disconnection of spindle 53 from gear 54 (see Figs. 1 and 24). When the frame 77 is in the position shown in Fig. 24 the sleeve 87 clears a shoulder stud 87$^a$ as shown and the frame can be bodily withdrawn endwise but when the frame is in normal operating position as shown in Fig. 1 the shoulder of stud 87$^a$ carried by the frame of the machine engages over the edge of extension 87 and prevents the withdrawal of the frame.

At the left of the recorder is a group of time type-wheels 88, which are set by the magnet 11, the lever 37 (Fig. 21) and the toothed segment 41. The last-named element is fast to the shaft 65 near its right-hand end, and rotates this shaft as it is raised by the pawl 38. At the other end of the shaft 65 is fixed an arm 89 (Fig. 20) connected by a link 90 with a three-sided frame 91 similar to the frame 47 used in connection with the group of daily time wheels, and pivoted about the type-wheel shaft 13. This frame 91 carries a pawl 92 that engages with a gear-wheel fast to the first wheel of the total time group and operates in unison with said frame 47 to set the wheels of its group. Whenever, therefore, the daily time group of type-wheels 49 is operated to record working time, the total time wheels 88 are operated to record an equal amount of time.

On the shaft 18 which carries the printing platen 22 is a second sleeve 94 which has a notch in its end extending beyond the gear-wheel 95 which is loose thereon (see Fig. 4) and this sleeve is locked to the gear-wheel by the pawl 94$^a$ and released to permit the operation of the printing pad 96 carried by it, to print from the total time group. These parts are of the same construction as the corresponding devices at the other end of the shaft for controlling the operation of the printing pad 22 and this similarity extends to the presence in connection with gear-wheel 95 of a lever 97 like lever 25, for turning the bar 24 and forcing its points through perforations in a card in the card chute.

When the employer has inserted his "employer" card into the machine and turned his key 3 to take a record of total time, it will be understood that the bar 24 will be rocked thereby forcing its points through perforations in the employer's card. These points also prevent a second card, for example the workmen's card, being inserted in the machine until the employer has completed the turning of his key and restored bar 24 to normal position. Neither can the employer place a card in the machine during the period that a workman is effecting a printing on his card. It will be understood that in the normal operation of the device the workman places his card in the machine and leaves it there, this being necessary to render the normally pulsed magnet armature 10 effective to actuate the various type wheels. Until a card is inserted, parts 6, 7 and 8 as previously explained prevent any effective movement of the parts which operate the various type wheels. After placing the card in the machine the workman does not turn his key until he has completed a given job. The employer can freely remove the workman's card and insert his own card at all times except when printing is being effected and the workman's key is partially turned.

From the above description the nature and purpose of the elements comprising the machine, so far as their operation to record time and value is concerned, will be understood.

In the operation of the machine it is necessary to account for stoppages in work over night, during noon hours, or the like. This may be done by the electrical control of the magnet circuit as is customary in time recorder installations, or the workman may remove his card from the machine during such periods and thus stop the registering of time.

With the present machine, the workman may operate his key, printing on the card the time and value quantities of all the wheels of which he has access. Thereafter the return movement of the key will restore all wheels of which he has control to zero. This same operation may be performed by the workman at any time, for example at the time a job is completed. The resetting devices will therefore be now described.

The type-wheel shaft 13 carries at each end a loosely mounted gear-wheel, that at one end being indicated by 15, the other by 97', and as the construction of these parts is the same at each side of the machine that only at the left or employer's side will be described in detail. The gear 97' is on a sleeve and when the key is turned to print a pawl 98' (Fig. 5) pivoted to gear 97' rides over the type-wheel shaft or a sleeve fixed thereto and no motion is imparted to said shaft. When the key is, however, turned backward to reset the type-wheels, this pawl engages with a notch in the sleeve and the type-wheel shaft is rotated. Each type-wheel carries a pivoted pawl 99 held by a spring against the shaft which has a notch in it, so that when the shaft is turned it picks up these pawls and turns the type-wheels back as far as they may have been advanced by the time impulse magnet.

Shaft 13 is a split shaft, the junction of the two parts of the shaft being within the plate 91, shown in Fig. 22. The split shaft construction is necessary in order to permit the resetting of the total time wheels 88 independently of the workmen's time, wage and overtime wage wheels 49, 50 and 71. The workmen's key and the boss 12 into which it is inserted is of such character that the workman can insert his key only in the boss 12 at the right hand end of the machine (see Fig. 1). The employer's key and both right and left hand bosses 12 are of such character that the employer can either insert his key in the left or right hand boss 12 (see Figs. 1, 4, 5 and 6). It therefore follows that the workman can print from and reset the wheels under his control, namely 49, 50 and 71, at will. The employer or his representative may print from and reset his total wheels 88 at will and if desirable he can print from and reset the wheels 49, 50 and 71 under the control of the workman. To do this he must insert his key into the boss 12 on the right hand, or workmen's side of the machine (see Fig. 1). The workman, however, can not print from or reset the total time wheels 88 which are exclusively under the control of the employer. The printing from and resetting of the workman's wheels by the employer is in a way an abnormal operation, but is provided for in order that the employer may print from and reset the entire device should the workman's key be lost or the workman unavailable for any reason.

The type-wheel shaft also carries the cams 100 upon which bear stop pawls 101 (Fig. 10) which are spring actuated, and in the cams are notches which are engaged by the pawls, the latter being pivoted to the frame and this stops the shaft and key at the zero position, preventing further movement in that direction.

The operation of the daily time type-wheels through the instrumentality of the segmental rack 41 has been heretofore described so far as the raising of the segment by the pawl 38 is concerned, but when the segment has been raised a certain number of steps necessary to move the units type wheel one step it must be dropped to lower position without returning the type wheel to be in condition for another cycle of movement. The means for accomplishing this are shown in Figs 1, 3 and 26. In Fig 26 a link 102 is pivotally connected to the swinging frame 47 and as the latter rises this link is drawn up with it. To the lower end of link 102 is pivotally connected a light rod or wire 103 connected to the free end of a plate or bar 104 which is fixed to the spindle of a sleeve 105 fast thereto which carries an arm 106. This arm is bifurcated and normally lies under a loose sleeve 107 on a post 108 and supporting a weight 109. Around the post is a spirally wound wire 110 (see Fig 6) engaging with threads in the central opening through said weight.

Segment 41 is raised with a step by step action by a pawl 38 from its lowest position shown in Fig. 21 to its highest position shown in Fig. 26. In this latter figure pawl 38 is shown retracted from contact with the segment and the segment 41 is just about ready to drop. During the elevation of segment 41 it is retained in position between the operations of pawl 38 by a pointed pin 44 on pawl 42 which engages the notches of segment 41. When segment 41 is lifted by pawl 38 so that its last notch is beyond pin 44 (see Fig. 26) means are provided for swinging pawl 42 clockwise to clear pin 44 from the serrated periphery of segment 41 and for retaining the pawl pin in this clear position during the dropping of the segment. This means comprises a crank lever 111 pivoted to the frame and which is rocked counterclockwise to the position shown in Fig. 26 by means of an arm 112 on link 102, as link 102 is raised to the position shown in Fig. 26 by frame 47. In this position the end of crank arm 111 engages the rear end of pawl 42 and by reason of spring 43 retains the pawl 42 in the position shown. When therefore the segment together with frame 47 and link 102 have been raised to the proper extent, the lever rocks and locks the pawl 42, whereby the segment on the retraction or down stroke of the pawl 38 is freed and starts to drop.

As the frame 47 (Fig. 26) and link 102 rise, the hub 105 is turned and the sleeve 107 is lifted carrying up with it the weight 109 which causes the spring 110 (Fig. 6) to revolve around the post 108, but when the frame drops, the weight requires an appreciable time to fall to its lowest position because it can only descend by rotating about and traveling down with the spiral spring 110.

Unless the pawl is held out of operation for an appreciable time, it would again engage the dropping segment and lock it before it had completed its movement, but as the link 102 drops the arm 112 leaves the lever in engagement with pawl 42, where it is held by the tension of the spring 43 until the weight 109 has descended sufficiently to strike a pin or arm 113 carried by the lever 111, and this disengages the lever 111 and leaves the pawl thereafter free to engage with the toothed segment 41 which has had ample time to fall back to its lowest position without interference by the pawl 42.

All of the essential features of the device have now been described with the exception of a device for alining the money value type-wheels, shown more particularly in Fig. 27. It will be observed that the movement of these wheels is imparted through gears, some of very fine mesh, and that such movement, therefore, is proportionate to the time. Hence it may well happen that the type on these wheels will not be exactly in printing position when an impression is taken. To remedy this the money value wheels are alined immediately prior to an impression by the printing devices.

On the shaft 18 of gear wheel 16 and turning therewith is a cam 114 on the periphery of which bears a pin 115 in a spring-actuated lever 116 pivoted at 117. The short arm of this lever is connected by a link 118 with an arm 119 fixed to the shaft 120 and adapted to slightly turn said shaft back and forth whenever the key is turned to take an impression and immediately before the printing platen is released.

Fixed to the shaft 120 are two arms 122 which have pins adapted to engage with stops 123 on pawls 121 pivoted to the arms 119 one for the gear-wheel of the first type-wheel of each group of money-value type-wheels. When the shaft 120 is oscillated these pawls 121 are drawn back and pushed forward, and at the same time lowered so that a notch 124 in said pawls comes down over the teeth 125 in a disk 126 fast to the first wheel (Figs. 19 and 27), and by such movement pushes or pulls said disk and hence the first type-wheel to a position where it presents a type in the correct printing position.

One of the cards for use in this machine is shown in Fig. 27 and marked 127. It has appropriate sections 128, 129 and 130 for receiving the impressions of workmen's time, the money value of such time and overtime money value, and also has a space 131 to receive the imprint of total time. In the normal operation of the machine the workman makes the time impressions in spaces 128, 129 and 130. A separate card may be used for each day, or each job, as desired. Then at the end of a time period, say at the end of a week, or when a given job is completed, the employer takes one, preferably the last, card turned in by the workman, places it in the machine, and makes the total time imprint in space 131. This total time imprint is then used by the employer to check the subtotal times on the different cards previously turned in by the workman in that particular time or job period. The totals of the time amounts imprinted in space 128 of the various cards should agree with the total time imprint in space 131. The total time imprint in space 131 may be utilized for other purposes as well, such as giving a quick total check on the time of any job or the total time put in by a workman up to the time of taking the total time impression.

While I have shown the workman's and the employer's time imprints upon one and the same card, it is obvious that separate cards may be used by the employer and workman. The particular kind of card depends largely upon the timekeeping system employed. Should separate cards be used, the workman's card would of course be removed before the employer inserted his card in the machine. Ordinarily the employer would make his time imprints after the workman had removed his card for example at night; but should they be made at other times a few seconds might be lost due to the time interval involved when no card was in the machine. This time would not appreciably affect the workman's record.

Other details, although shown, need not be described in detail, as they are not a part of the present invention and will be well understood by those skilled in the art.

What I claim is:

1. In a recording mechanism of the kind described, the combination of a set of workmen's time and wage recording type wheels adapted to accumulate time of work and wages, based upon said time and the workmen's rate, a set of total time wheels adapted to accumulate thereon time records which are a summation of one or more different time records upon the workmen's time wheels, a driving means adapted to set up concurrently the time records upon the workmen's and total time wheels and to likewise set up wage records upon the wage wheels, a printing mechanism adapted solely to take a record from the set of wheels recording the workmen's time and wages, a second independent printing mechanism adapted to solely take a record from the set of total time wheels, independent means for operating the said printing mechanisms, and independent means for resetting the said sets of type wheels to zero position.

2. In a recording mechanism of the kind described, the combination with groups of time-recording and wage-recording type-wheels, printing mechanism for taking impressions therefrom, and means for operating the printing mechanism, said means thereafter resetting the type-wheels to zero position, said means being under the control of a workman, of a group of total time type-wheels set by the same driving mechanism that sets the workman's type-wheels, and independent means for printing therefrom, said means resetting the type wheels to zero position under the control of the employer.

3. In a recorder of the kind described, the combination with a type-wheel shaft of a group of workman's time-wheels and a group of total or employer's time-wheels mounted thereon, an impulse magnet and ratchet mechanism for setting both groups of type-wheels to indicate elapsed time, printing devices for each group of type-wheels, independently controlled and operated means for operating said printing mechanisms, and independently controlled and operated means for resetting the groups of type-wheels to zero position.

4. In a recorder of the kind described, the combination with a group of workman's daily time-wheels and a group of employer's total time wheels, and means common to both for setting them to indicate elapsed working time under the control of a workman, of independently acting printing mechanism for the two groups of wheels, independently acting means for resetting the two groups of wheels to zero position, independently controlled and operated means for operating both of said mechanisms, and special keys for engaging with and operating the same.

5. In a recorder of the kind described, the combination with a group of workman's daily time-wheels, a group of wage-recording wheels, a group of overtime wage-recording wheels and a group of employer's or total time wheels, a setting mechanism under the control of the workman common to all the groups of wheels, printing mechanism for the workman's time and wage wheels, an independent printing mechanism for the employer's or total time wheels, independently controlled and operated means for operating the printing mechanisms and independent means for resetting the employer's wheels and the other groups of wheels to the zero position.

6. In a recorder of the kind described, the combination with time-indicating and wage-indicating wheels, an impulse magnet and means intermediate the same and the time wheels for operating the same directly step by step, means intermediate the magnet and wage wheels for operating the same step by step comprising a train of gears transmitting movement proportional to the value of the workman's time to the wage-wheels, printing mechanism and means operated by the movement thereof to aline the wage-wheels whereby the type or characters thereon will be brought to the exact printing position prior to each impression.

7. In a recorder of the kind described, the combination with sets of time registering recording wheels and sets of wage-registering recording wheels of a magnet and oscillating armature for operating both sets of wheels, a train of gears between the armature and the wage-registering recording wheels for imparting a movement to said wheels proportional to the value of the workman's time and to the movement of the said armature which records the time, a section of said train of gears being capable of being withdrawn and replaced whereby gears of different relations may be used for indicating different money values of time.

8. In a recorder of the kind described, the combination with a time-controlled operating magnet of time-wheels, wage-wheels and overtime-wage-wheels, a clutch mechanism between the driving mechanism and the overtime-wheels, and an electro-magnet and armature for operating the said clutch and thereby connecting the overtime-wheels with the driving mechanism when so desired.

9. In a recorder of the kind described, the combination with an impulse magnet and armature of time-indicating-wheels, a segmental ratchet adapted to be raised step by step by said armature to set said time-wheels, a retaining pawl engaging with said ratchet, a means operated by the ratchet for locking said pawl out of engagement with the ratchet at a predetermined point in its path of movement, and a slow acting means for releasing the pawl and permitting it to re-engage with the ratchet.

10. In a recorder of the kind described, the combination with time and wage wheels and means for operating the same, of a card chute for receiving a card to be printed, a printing mechanism, a device for locking the card in the chute operated solely by the operation of the printing mechanism, and means for resetting the wheels to zero position controlling the means for locking the card whereby said card may be withdrawn only upon the operation of the resetting means.

11. In a recorder of the kind described, the combination with time-recording and wage-computing wheels, a magnetically controlled driving mechanism for setting such wheels, a train of gears between the same and the wage-wheels, a removable frame carrying a portion of said gears, which is adapted to be withdrawn and replaced by other frames having gears of different relations to compute wages at different rates.

12. In a recorder of the kind described, the combination with a set of workmen's time and wage recording type wheels and a set of total time wheels, all operated by the same driving means, of means for rendering effective the said driving means upon the insertion of a card adjacent the said type wheels, independent printing mechanism for the two sets of time wheels, and independent means for resetting said sets of time wheels to zero position.

13. In a recorder of the kind described, the combination with a set of workman's time and wage recording type wheels and a set of total time wheels, all operated by the same driving means, of means for rendering effective the said driving means upon the insertion of a card adjacent the said type wheels, independent printing mechanism for the two sets of time wheels, independent means for resetting said sets of time wheels to zero position, and means coöperating with the printing and resetting means for retaining the card within the machine until the printing and resetting operation is completed.

14. In a time recorder having workman's time wheels and wage wheels and means for driving the same, in combination, a rate changing gearing for said wage wheels, said gearing comprising a gear mounted upon a fixed axis and a gear mounted upon a swinging axis, means for maintaining said gears in mesh, said means being adapted to permit the replacement of one of the gears by a gear of different diameter to vary the driving ratio, and to thereafter maintain proper driving enmeshment of the said gears.

15. In a recorder, in combination, a set of time wheels, a normally pulsed but normally ineffective magnetic driving mechanism for said wheels, and means controlled by the insertion of a card in the machine for rendering the driving mechanism effective to drive the type wheels.

16. In a recorder of the kind described, in combination, a set of total time wheels, a set of workmen's time recording wheels, a common actuating mechanism therefor, an impulse magnet and an armature, a segmental ratchet connected to said common actuating means adapted to be raised step by step by said magnet and armature, and to thereby actuate the actuating means, a retaining pawl engaging the ratchet and means operated by the ratchet for withdrawing the pawl from engagement with the ratchet and retaining the same out of engagement therewith until the ratchet has descended to lower position.

17. The invention set forth in claim 16 in which wage wheels are provided, said wage wheels being driven from the common actuating mechanism by means of replaceable gearing.

18. In a time recorder having workmen's time wheels, wage wheels and means for driving the same, a train of gears adapted to form part of the driving connections for the wage wheels, and a removable frame carrying a portion of said gears which is adapted to be withdrawn and replaced by other frames having gears of different relations to compute wages at different rates.

19. In a time recorder having workmen's time recording wheels and wage recording wheels, and means for driving the same, a train of gears adapted to form part of the driving connections for the wage recording wheels, a removable frame carrying a portion of said gears, which is adapted to be withdrawn and replaced by other frames having gears of different relations to compute wages at different rates, and means associated with said frame for retaining the same against accidental withdrawal until a particular manipulation is effected.

In testimony whereof I hereunto affix my signature.

FRED M. CARROLL.